July 2, 1935.  H. C. LEVY  2,006,899
HEADLIGHT
Filed May 25, 1931   2 Sheets-Sheet 1

HENRY C. LEVY
INVENTOR.

BY Rudolf Hildermann
ATTORNEYS.

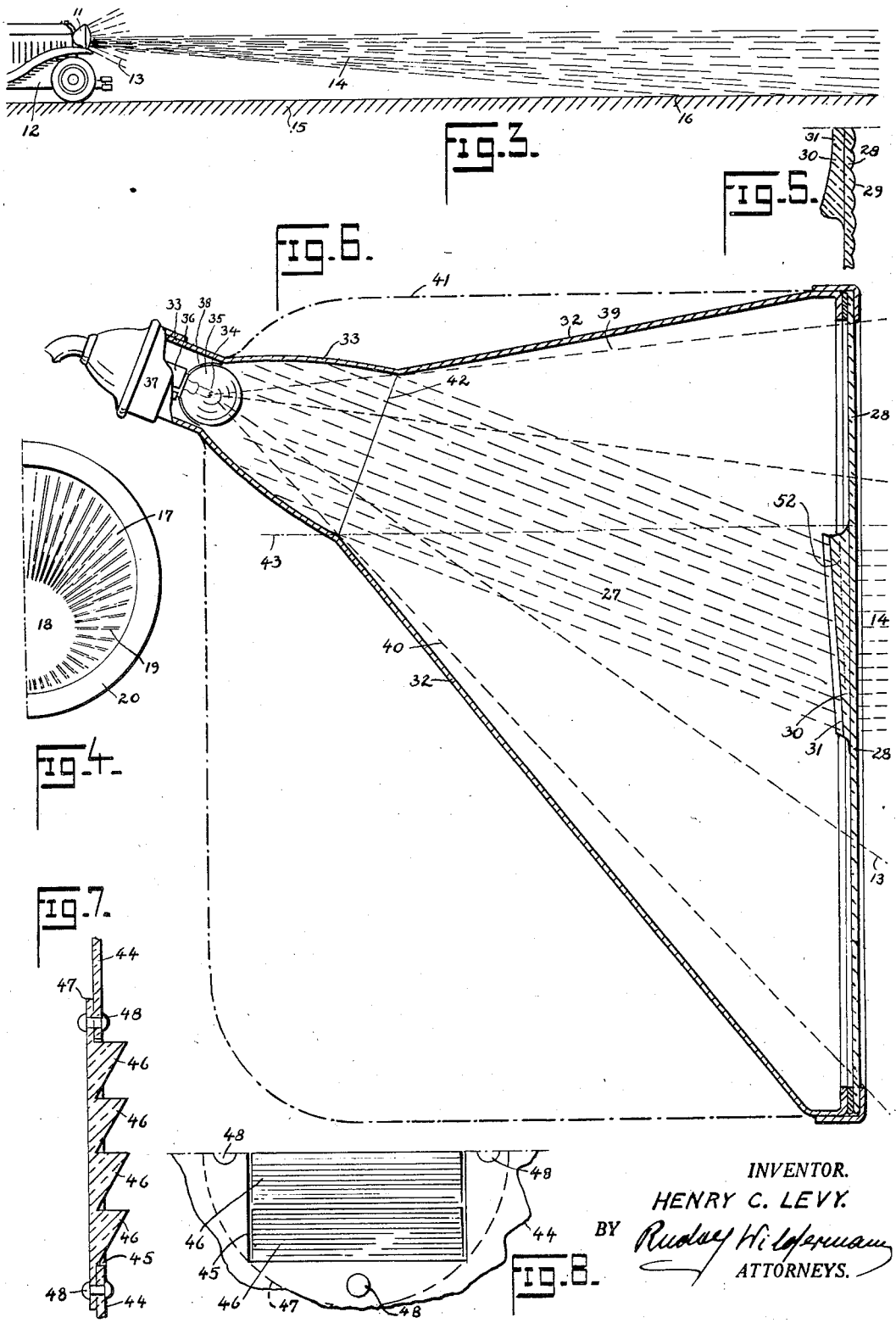

Patented July 2, 1935

2,006,899

UNITED STATES PATENT OFFICE 2,006,899

HEADLIGHT

Henry C. Levy, New York, N. Y.

Application May 25, 1931, Serial No. 539,649

3 Claims. (Cl. 240—41.3)

This invention relates to headlights, and more particularly to headlights used on vehicles and to the distribution of the light radiated from such a headlight.

One of the objects of this invention is to remove the bulb and source of the directed rays of a headlight from a normal level of vision.

Another object of this invention is to concentrate and direct rays of the source of light of a headlight away from the normal level of vision and to redirect them for illumination at a predetermined distance.

A further object of my invention is to provide a headlight on a vehicle, which gives sufficient illumination for all purposes of travel at night, which avoids however, under ordinary circumstances, a glare which would annoy others.

Another object of this invention is to provide in connection with a headlight, a single source of light which is partly used for a subdued, general illumination, directly in front of the vehicle, and at the same time, for a well directed stronger beam of light for the illumination of points at a greater distance ahead of the vehicle.

These and other objects of my invention will be further disclosed in the following description and by the exemplary showing of the accompanying drawings, in which.

Figure 1:
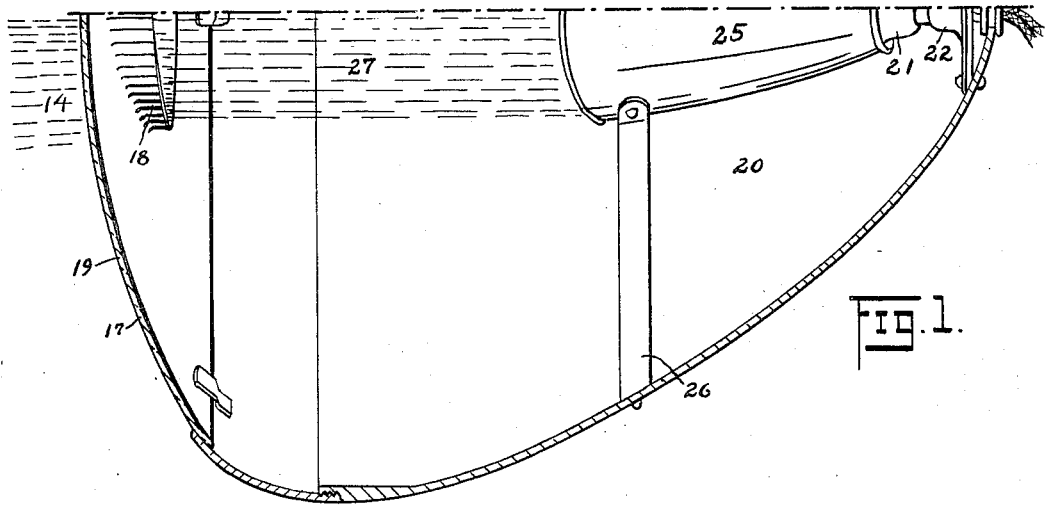
Fig. 1 shows the sectioned top view of a substantially bi-sected headlight.

Fig. 3 indicates generally in which manner the light emanating from the headlight of a vehicle is distributed by my improvements.

Fig. 4 shows a front view of the substantially bi-sected lens, which I use in one execution of my invention.

Fig. 5 shows a sectional, sectioned top view of a lens used in connection with one modification of my invention.

Fig. 6 shows the sectioned side view of a modified headlight which makes use of the lens shown in Fig. 5.

Fig. 7 shows, in sectional, sectioned side view, modified prism means.

Fig. 8 shows a corresponding, sectional elevation.

Similar numerals refer to similar parts throughout the various views.

The headlight 11 on the automobile 12 of Fig. 3 is shown to diffuse a soft, non-glaring light 13, substantially in all directions, in which light is ordinarily diffused from a headlight. At the same time a bunched beam 14 of light emanates from below the center of the headlight. That beam is substantially parallel to the ground 15 along its upper level, but it is vertically fanned out, so that it strikes the ground 15 at 16, a certain distance ahead of the car. The ground is illuminated from that point on, frontwardly, as well as the space thereabove substantially up to the level of the headlight.

The front view of the lens 17 (Fig. 4) shows that the strong concentrated beam of light 14 emanates from a substantially clear part 18 of the lens arranged below the center thereof, and shows the rest 19 of the lens to be ribbed or fluted by corrugations, which serve to diffuse the light passing therethrough, so as to produce the diffused light beam 13. The diffusion may be brought about by frosting the lens, by a coat of paint or other means and for making a clear lens translucent.

Figure 2:
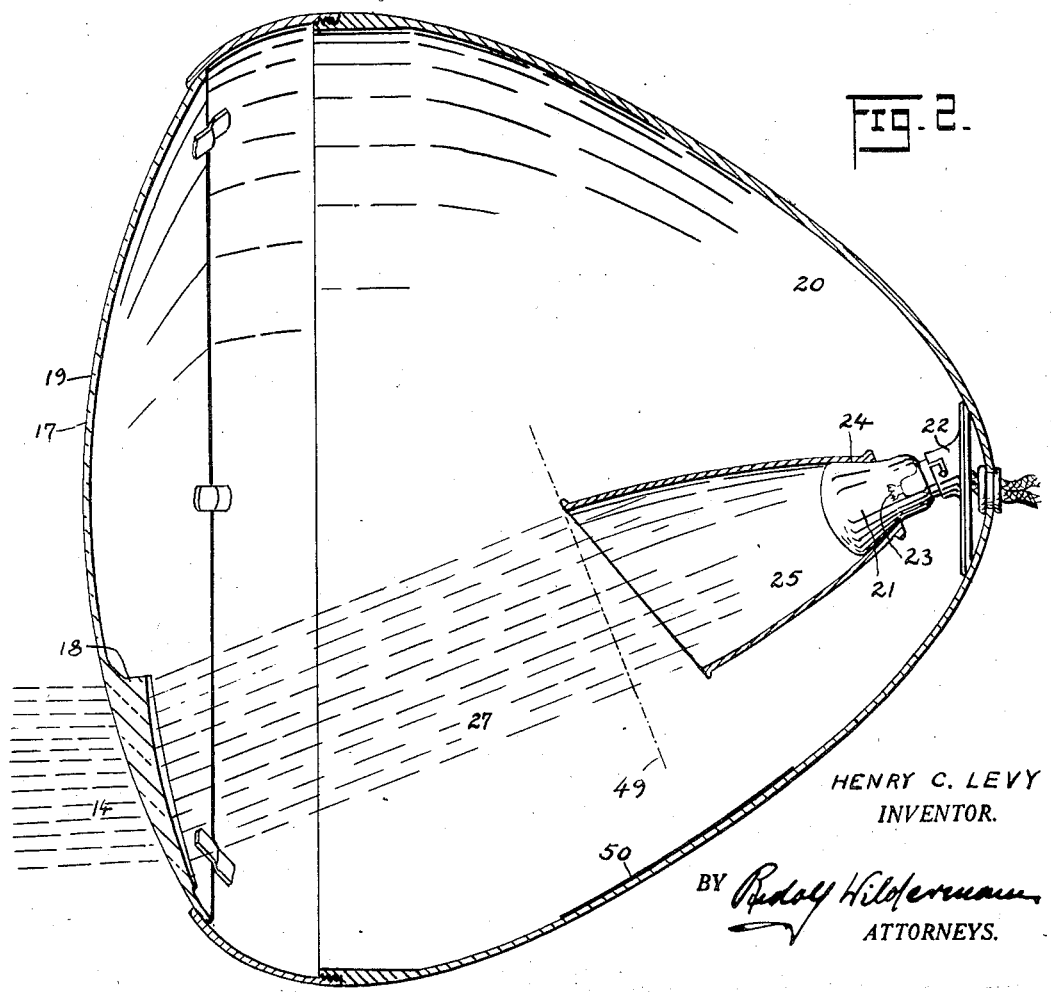
Fig. 2 shows a corresponding, sectioned side view.

This lens 17 is mounted in the front of the casing 20 of the headlight, as shown in Figs. 1 and 2. The light source has the shape of a single bulb 21, which is mounted in a socket 22 on the inside, upon the back, of the casing 20. The socket 22 is disposed at a downward incline, so that the bulb faces the clear part 18 of the lens 17. The wall 24 of the bulb 21 is parabolically disposed, the filament 23 being concentrated near the focus of the parabola; a correspondingly disposed parabolic reflector 25 fits over the bulb 21 and extends beyond it. The reflector 25 is suitably mounted in the casing 20. In the substantially bi-sectional view of Fig. 1 straps 26 on both sides of the reflector are indicated as means supporting it in position. Light projected from filament 23 through the non-parabolic, unshielded part of bulb 21, to the rear of reflector 25, strikes the suitably disposed wall of casing 20 and from there is diffusedly reflected through lens 17, (in the manner of the non-glaring light 13). The bulb 21 and reflector 25 are arranged substantially above the clear part 18 of the lens.

The parabolically disposed wall of the bulb and the reflector 25, concentrate and project light issuing from bulb 21 in a downward direction corresponding to the angle at which the socket 22 is disposed, and the concentrated beam 27 strikes the lens 17 at a lug inwardly protruding therefrom and substantially corresponding to the clear part 18 in size, that lug being optically adapted in such manner as to give the beam 14, issuing from the source of light, the direction and shape indicated in Figs. 1, 2 and 3. For that purpose the clear part 18 of the lens is prismatically disposed along a vertical section, as shown in Fig. 2, so that the downwardly directed beam 27 is straightened out into substantial parallelism with the ground.

The prism is inverted, stands on its edge. There may be a slight diffusing concavity to that prism, so that the light projected therefrom does not represent a fully parallel beam but is fanned out in the manner of the beam 14 of Fig. 3 and strikes the ground at a predetermined distance in front of the car.

Along the horizontal section of the lens shown in Fig. 3 the part 18 is slightly concaved, so that the beam 27 projecting therethrough, is slightly fanned out into the beam 14, which therefore broadens laterally in a manner similar to the diffusion in a vertical direction, which was described above. The horizontal concavity of the prism part is more pronouncedly indicated in the modification of Fig. 5. The width and height of the truncated cone or pyramid formed by the beam 14 may thus be adjusted in order to give the desired cross-section to the beam.

The headlight of Fig. 6 shows a modification of the arrangement of the parts. Whereas the lens 17 of Figs. 1, 2, 3 and 4 has the shape of a spherical segment, the lens 28 of this modification is substantially flat, the front thereof being vertically fluted as indicated at 29 in Fig. 5; or it may be frosted. The thickened part 30 is arranged in this modification near the center of the lens and is cemented onto the back thereof. That part is again invertedly prismatically disposed along a vertical section thereof so that it is thinner at the bottom than at the top, and it thus levels the downwardly directed beam; its rear face 31 may be concavely disposed in the manner shown in Fig. 5 unless the flutes 29 upon the front of the lens provide for sufficient lateral and downward diffusion of the concentrated beam of light passing through the part 30.

The casing 32 of the headlight of Fig. 6 has the shape of a horizontally disposed oblique, truncated cone, and it has an angularly upwardly disposed rearward extension 33, which is again parabolically shaped along its frontward extent. That extension supports the bulb and serves to concentrate onto the part 30 the beam emanating from the light source 34 which is substantially centrally disposed in a standard lamp 35. The lamp 35 is mounted in a socket 36 which forms part of a detachable part 37 cap-like extending over the back of the extension 33.

A spherically disposed reflector shield 38 is shown to extend around the back of lamp 35 in substantial concentricity with the light source 34, covering that rear part of the lamp over which the parabolic part of extension 33 cannot be extended for technical reasons. The shield may take the form of a metallic plating or covering directly applied to the bulb and it serves to reflect the rearwardly projected light beams of the light source 34 past said source, in close proximity thereto, so that they are reflected by the parabolic part of reflector 33 in substantially the manner and direction in which said part reflects the rays projected thereonto directly from said source.

The parabolic reflector is preferably of such a length that the light issuing from the source 34 does not directly strike the casing 32. The light, which strikes the part of the lens surrounding part 30 is either issued directly from the light source 34, or reflected by the shield 38. Only a fractional part of the light passes therefore through the outer parts of the lens, and the direction thereof is well controlled. It is seen that the extreme upwardly and downwardly directed rays 39 and 40, which do not strike the parabolic part of the extension, pass unreflectedly through the lens and the same applies to all radially projected beams comprised in the sector confined by said rays.

By obliquely disposing the base 42 at which the parabola ends, instead of arranging said line at right angles to the axis of the parabola, as shown, the sector comprised between rays 39 and 40 may be shifted in relation to the beam 27 so that the position of part 30 may be shifted in relation to the lens. Fig. 2 shows such obliquity at the end of a reflector, as compared with a line 49 normal to the axis of the parabola.

Since in the headlight of Fig. 6 the casing 32 is not involved in the optical functions it may be omitted. Said headlight is shown to be accommodated in a more conventionally shaped housing indicated by the dot-dashed line 41 in Fig. 6. The neck of extension extends through the back of such a drum-shaped housing, the lens closing the front thereof.

The horizontal line 43 indicates the level of the lowest point of the parabolic reflector and the prism is disposed below that level. Neither the lamp nor the light concentrating reflector can therefore be seen directly from a normal level of vision, through the clear part of the lens; this further avoids glare. The section of the housing 20, which is seen in Fig. 3 from above the level of the prism is provided with a dull, non-reflecting surface 50, so that neither a bright part, nor a reflection of the reflector 25 can be seen.

The science of optics teaches us that a prism will least refract rays which pass through the body thereof in a direction normal to its center line, that center line extending from the center of the base to the edge. The dot-dashed line 52 indicates in Fig. 6 the direction in which that center line is disposed. The rays 27 which pass away from the prism as rays 14 are therefore subjected to greater refraction than those rays of least refraction referred to above. The rays of least refraction would extend upwardly away from the prism and the prism is disposed at such an angle, that the normal line of vision, in the direction of which the headlight is ordinarily viewed from an approaching car, by a pedestrian, substantially coincides with that line of least refraction. In other words the driver of a car coming towards the car equipped with my headlights or a pedestrian facing in that direction, will not see such a high point of the inside of the headlight through the prism, as he would see, if the laws of physics would prescribe like refraction for all angles at which a prism is viewed or if the prism were differently disposed. It is also understood that from the direction of rays 14 towards the line of least refraction, the refraction steadily decreases and thereabove it does not become the same refraction as that of rays 14, unless the prism is viewed at a very steep angle. In this manner, I further avoid glare, because the person looking into the prism of the headlight will see upon the inside thereof points below, and further removed from the bright source of light and from the reflector surrounding the same, than might normally be expected.

When the angle of refraction, to the extent of which the downwardly directed rays have to be bent into parallelism is so great, that the prism would have an undesirable thickness at its base, it may be subdivided into a plurality of parallel prisms standing on edge above each other, as illustrated in Figs. 7 and 8.

The lens 44 is here shown to be provided with a square opening 45. The lens comprises a backing 47 from which arise several inverted prisms 46. The backing 47 is shown to be attached by mechanical means 48 upon the lens 44 in such manner that the prisms 46 extend into and through the opening 45.

While I have shown and described my invention with some degree of particularity, it will be realized that other modifications and changes may be resorted to under special conditions. I therefore do not wish to be limited and restricted to the exact details shown and described, but reserve the right to make such changes and modifications as may fairly fall within the scope of the subject matter now being claimed.

I claim:

1. In combination with the source of light and the lens of a headlight, a slight refracting section located below the level of said source, a reflector at a predetermined distance from said lens concentrating light of said source onto said section, said section substantially horizontally issuing said concentrated light, the edge of said reflector circumscribing a sector of unreflected light radiated from said source, and confining it within the outline of said lens, said unreflected light striking said lens and being diffused thereby while the beam passing said section is concentratedly projected at a distance.

2. In combination with a headlight, which comprises a source of light and a lens, light refracting means comprised in said lens below the level of said source of light, means extending substantially from said source toward said lens, and concentrating light radiated by said source onto said refracting means, said refracting means substantially horizontally projecting the said concentrated light, and means disposed to the back of said source and substantially fully reflecting the light of said source intercepted thereby, so that the light from said source is either diffused by said lens or projected as a concentrated beam by said refracting means.

3. In combination with a headlight, which comprises a source of light and a lens, light refracting means comprised in said lens, means extending downwardly from said source toward said lens and concentrating light radiated by said source onto said refracting means, said refracting means leveling said downwardly concentrated light, and means reflecting the light of said source which is not concentrated onto said refracting means onto said lens, so that said lens supplies a diffused light apart from the levelled, concentrated beam issuing from said refracting means.

HENRY C. LEVY.

CERTIFICATE OF CORRECTION.

Patent No. 2,006,899.    July 2, 1935.

HENRY C. LEVY.

It is hereby certified that error appears in the printed specification of the above numbered patent requiring correction as follows: Page 3, first column, line 21, claim 1, for "slight" read light; and that the said Letters Patent should be read with this correction therein that the same may conform to the record of the case in the Patent Office.

Signed and sealed this 20th day of August, A. D. 1935.

Leslie Frazer

Acting Commissioner of Patents.

(Seal)